Figure 1:
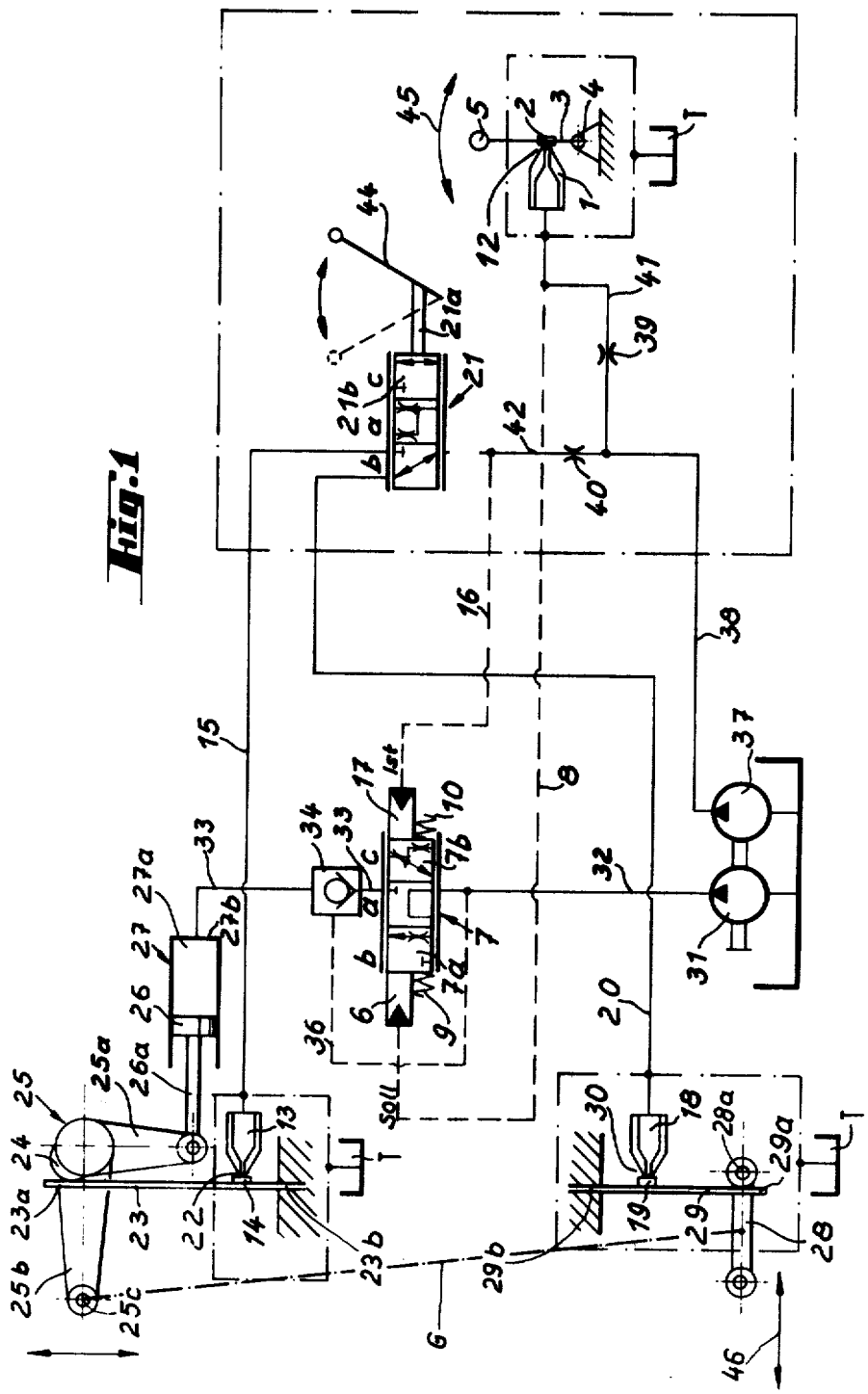

United States Patent [19]

Bartholomäus et al.

[11] 4,242,942
[45] Jan. 6, 1981

[54] HYDRAULIC POSITIONER WITH FEEDBACK DEVICE

[75] Inventors: Reiner Bartholomäus, Neuendorf; Karl-Heinz Bernhardt; Wolfgang Eberhard, both of Lohr; Hans-Dieter Kokus, Niederkassel; Herbert Lembke, Lohr; Heinz Schulte, Marktheidenfeld, all of Fed. Rep. of Germany

[73] Assignee: G. L. Rexroth GmbH, Lohr, Fed. Rep. of Germany

[21] Appl. No.: 21,818

[22] Filed: Mar. 19, 1979

[30] Foreign Application Priority Data

Mar. 17, 1978 [DE] Fed. Rep. of Germany ....... 2811585

[51] Int. Cl.³ ............................................. F15B 13/16
[52] U.S. Cl. .............................. 91/358 R; 137/625.67
[58] Field of Search ................ 91/358 R, 358 A, 359, 91/360, 361, 362, 363 R, 363 A; 137/528, 535, 538, 492.5, 625.25, 625.33, 625.48, 625.67

[56] References Cited

U.S. PATENT DOCUMENTS

| 2,563,295 | 8/1951 | Westbury | 91/360 |
| 2,608,182 | 8/1952 | Blasutta | 91/358 R X |
| 3,209,783 | 10/1965 | Pusch | 137/625.67 |
| 3,826,090 | 7/1974 | Bahl | 91/358 R |

Primary Examiner—Edward J. McCarthy
Attorney, Agent, or Firm—Michael J. Striker

[57] ABSTRACT

A hydraulic control arrangement with a feedback device for positioning an implement comprises a positioner including a fluid operated cylinder and piston unit, the piston of which is connected by a plurality of linkage elements to the implement. A first pump delivers through a pressure line fluid under pressure into the cylinder. A two-port three-position valve is interposed in the pressure line movable from a neutral position in which the fluid fed by the first pump is directed to a reservoir, to two operating positions to opposite sides of the neutral position, and in which one of the operating positions fluid fed by the first pump passes into the cylinder and in the other of the operating positions fluid from the cylinder can flow to the reservoir. A pair of pilot chambers are arranged at opposite ends of the valve for moving the latter from the neutral to either of the working positions. A second pump provides fluid under pressure for operating the valve. A first control line leads from the second pump to one of the pilot chambers and a fixed throttle cooperating with an operator adjustable throttle is located in the first control line. The arrangement includes also a feedback device comprising a second control line leading from the second pump to the other pilot chamber and a second fixed throttle cooperating with a second adjustable throttle is located in the second contial line. The flow-through cross-section of the second adjustable nozzle is adjusted by engagement with one of the linkage elements.

17 Claims, 4 Drawing Figures

HYDRAULIC POSITIONER WITH FEEDBACK DEVICE

The invention concerns a hydraulic positioner with feedback device with the latter performing a continual input-output comparison.

A hydraulic positioner with feedback device consisting of a positioning cylinder controlled by a pilot-actuated selector valve, is shown wherein the spool of the selector valve is coupled to the moving component of the positioning cylinder via a linkage with an interposed control spring. The control spring exerts its force against the pilot pressure acting upon the spool of the control valve, this pressure being adjustable by a pressure regulating valve. The respective control pressure corresponds herein to a given position of the moving part of the positioning cylinder. The mechanical connection of the selector valve with the positioning cylinder necessitates coordinated locating of these two assemblies. Considerable difficulties exist in many applications regarding coordinated locating of the selector valve, the positioning cylinder, and the input source.

The task of the invention consists therefore in obviating the coordinated locating of selector valve, positioning cylinder, and input source, so that every assembly can be optimally located within the hydraulic system, as required for the respective application, particular importance to be given to the feedback of the cylinder position to the selector valve, in order to obtain an operation that is simple and suited to the respective application.

According to the invention, this is attained by the characterizing features of claim 1. Further features of the invention are as per the subordinated claims.

Two examples of execution of the invention are represented schematically in the drawing, i.e. for positioning devices for soil-cultivating implements such as tractor-drawn plows with power and positioning control.

Figure 2:
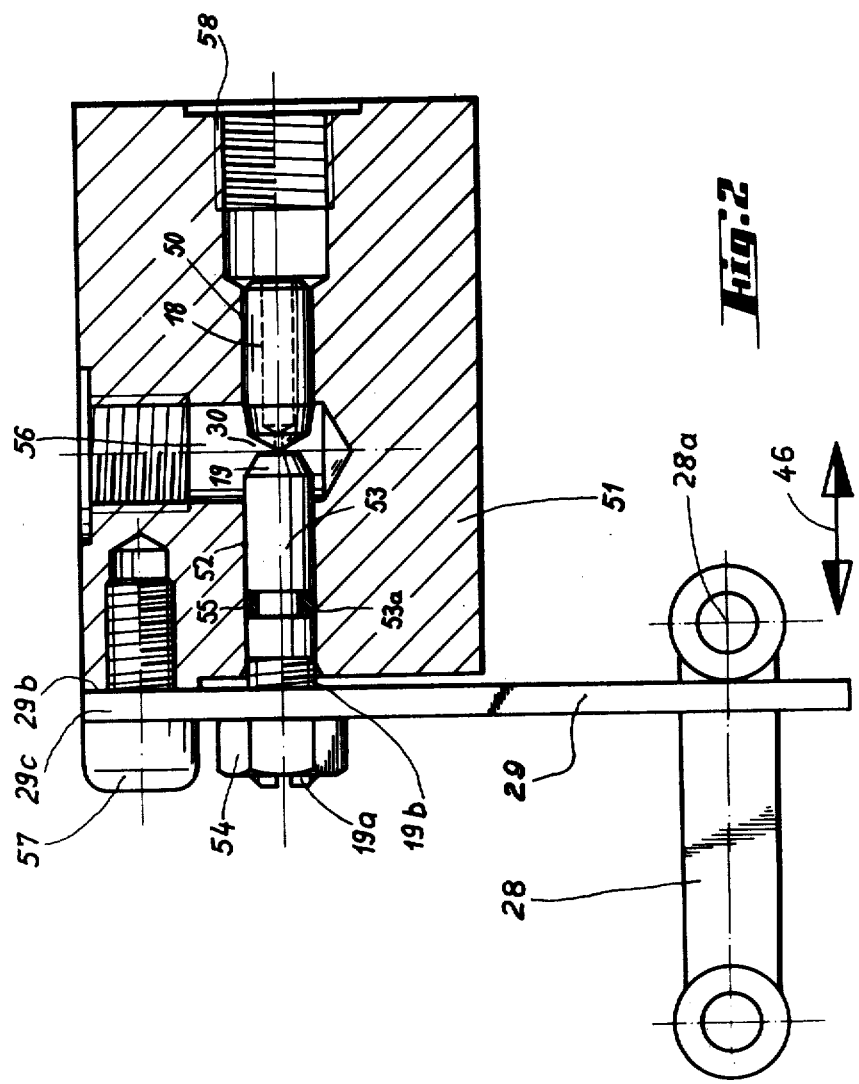
Figure 3:
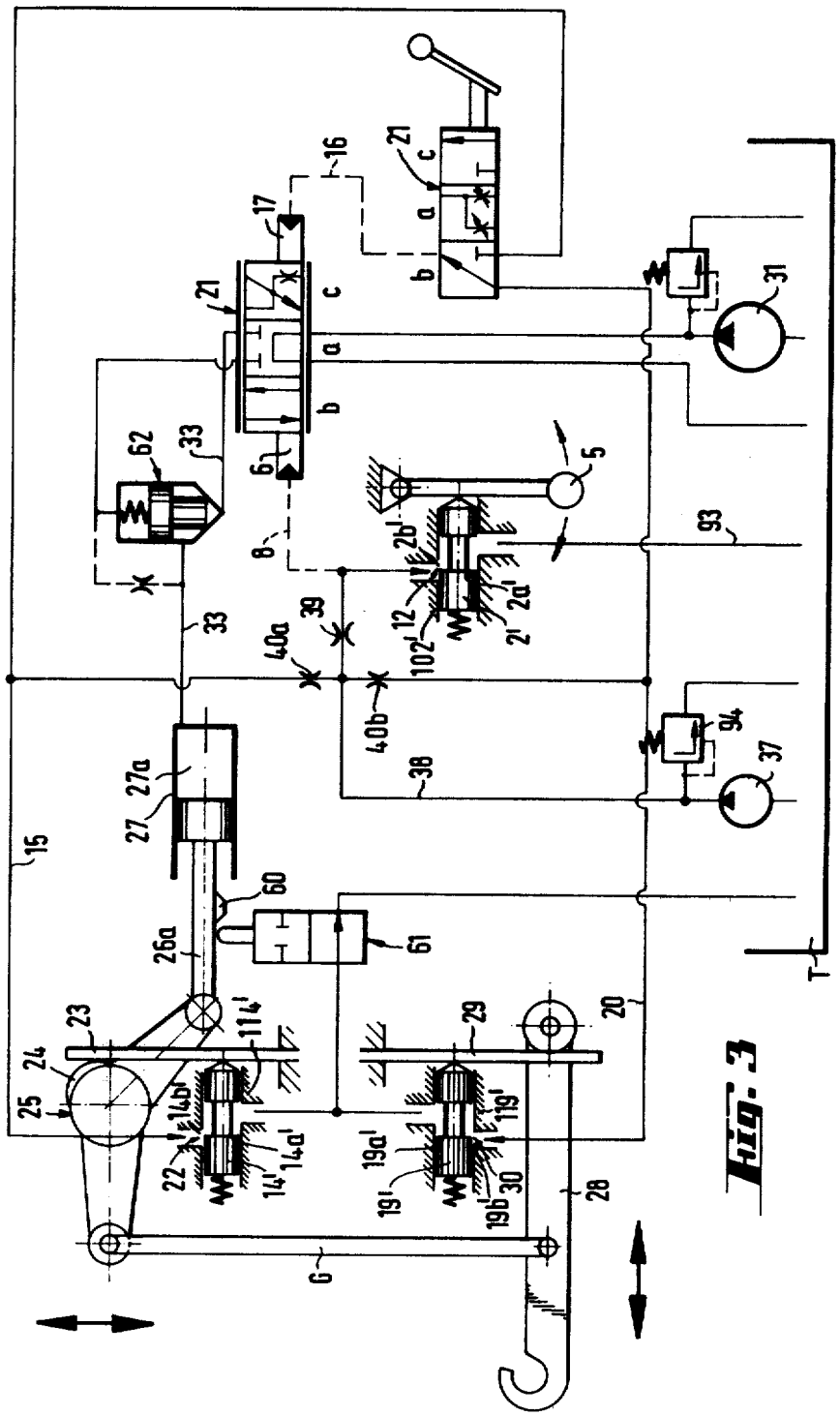
Figure 4:
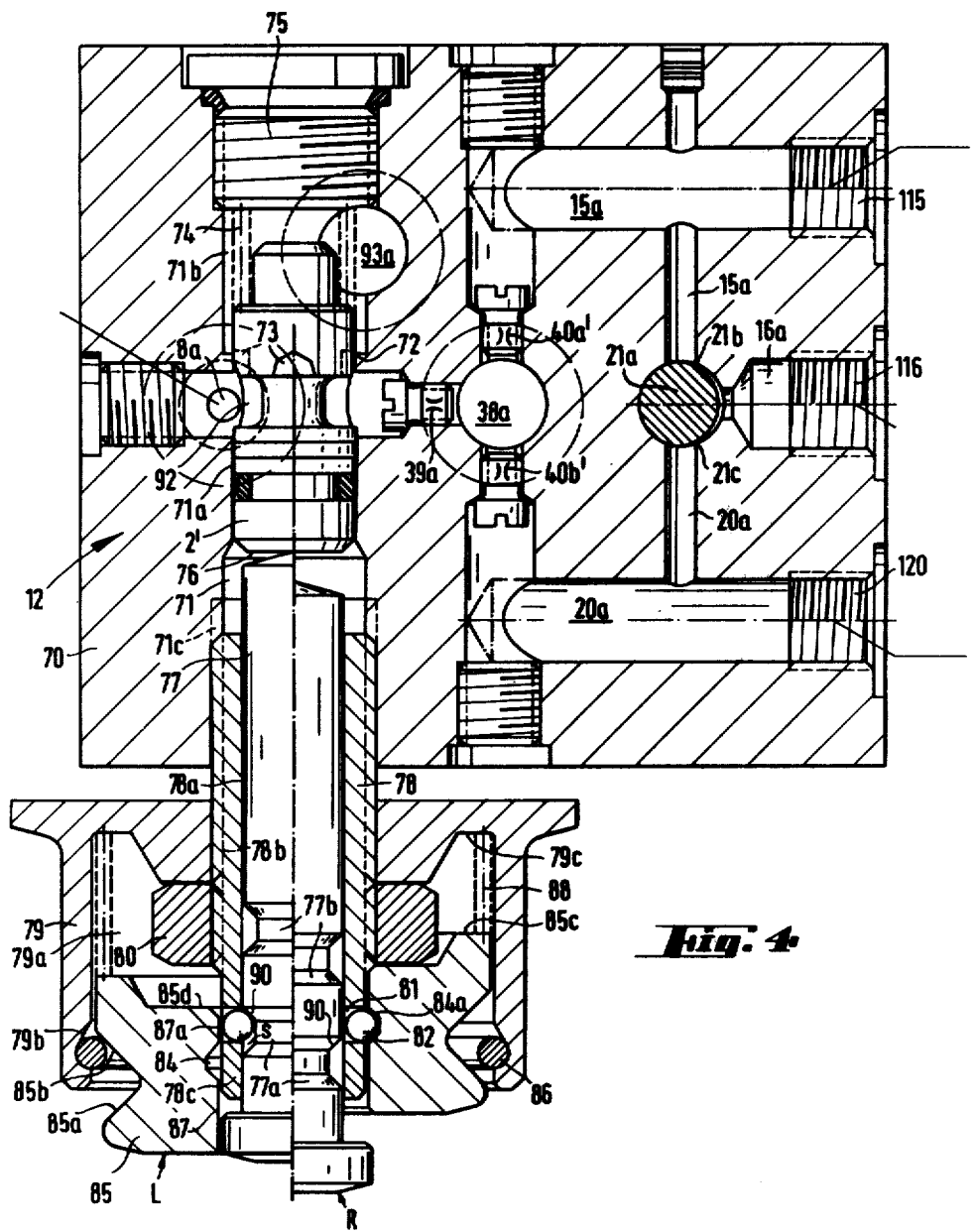

Illustrated are in:

FIG. 1 The design of the circuitry of the hydraulic positioner with utilization of nozzle-flapper as adjustable throttles, FIG. 2 the design of a throttle assembly as per FIG. 1, in section, FIG. 3 the design of the circuitry of the hydraulic positioner, using a control piston as adjustable throttle, and FIG. 4 the design of the manually operated adjustable throttle acting as input source, as per FIG. 3.

In FIG. 1, position 1 denotes the nozzle and position 2 the flapper or bounce plate which together form the throttle 12. The flapper 2 is set on a lever 3 which is linked on one end to the fulcrum 4, and has at its free end the handle 5 for adjusting the displacement of the flapper from the nozzle, thus serving to adjust throttle 12. Nozzle 1 is connected with the one pilot chamber 6 of selector valve 7 via the control line 8, and the initial position a of the selector valve, as shown, is determined by the centering springs 9 and 10.

A further nozzle 13, which together with the flapper 14 forms the throttle 22, is connected with the other pilot chamber 17 of the selector valve 7 via the control pilot line 15 and also via the mixing valve which is designed as a three-way valve with 3 control positions a, b, and c, and via the control-line section 16, whereby this connection exists respectively in the control position c and mixing position a of the mixing valve. In the control position b of the mixing valve, as shown, connection of the control line 15 with control-line section 16 is interrupted, and thus also the connection to the pilot chamber 17 of selector valve 7.

A further nozzle 18 forming together with the flapper 19 the throttle 30, is in connection with the pilot chamber 17 of selector valve 7 via control line 20, and also mixing valve 21 and control-line section 16, this in the control position b as shown and mixing position a of mixing valve 21. The flapper 14, which together with nozzle 13 forms the throttle 22, is mounted on a spring rod 23 which is firmly clamped on one end 23b whilst the free end 23a is in positive contact with the eccentric disc 24 of a bellcrank 25. The arm 25a of the bellcrank is linked to the piston rod 26 of the positioning cylinder 27. By this arrangement, the throttle area of throttle 22 and thus also the control pressure resulting between this throttle and the constant throttle formed by the fixed throttle 40, is determined respectively by the position of the piston rod 26a and piston 26 of positioning cylinder 27 linked to it. The free arm 25b of bellcrank 25 is pivotally connected at its outer end 25c by a linkage G, not shown in detail, with the lower control rod 28 of a soil-cultivating implement. The lower control rod 28 can be swiveled around the axle 28a which is resiliently mounted so that the power applied to the control rod 28 is transmitted as adjusting travel analogus to the double arrow 46, to the free end 29a of the spring rod 29 which is clamped at its end 29b and which carries the flapper 19, so that this movement determines the throttle area of throttle 30 which is formed by the plate 19 and nozzle 18. The positioning force transmitted by the soil-cultivating implement onto the spring rod 29 depends upon the respective position of the piston 26 in the positioning cylinder 27 to which the implement is connected via the lower control rod 29, the linkage G, not shown in detail, and the bellcrank 25. The working fluid is lead to the piston side 27a of the cylinder by a pump 31, via pressure line 32, the selector valve 7 and the operating-line section 33 which contains the pilot-operated check valve 34. If a double-acting cylinder is used, a non-return valve must be provided instead of a pilot-operated check valve 34. In the initial position a of the selector valve 7, as shown, the flow of working fluid supplied by the pump 31 is returned without pressure to reservoir T via selector valve 7. In this position of the control valve 7, the operating line 33 is isolated from the pressure line 32. The control chamber of the pilot piston of the relievable check valve 34, not shown in detail, is connected with the pressure line 32 via the control line 36. As long as the working fluid returns without pressure to the reservoir T via control valve 7 in its initial position as shown, the control line 36 is also without pressure so that the relieving check valve 34 is in its closed position due to the outside load of the implement acting via the bellcrank in the direction of the bottom 27b of the positioning cylinder. Pump 37 delivering control fluid for the operation of control valve 7 is coupled with the Pump 31 delivering the working fluid. The pressure line 38 of Pump 37 leads to the fixed throttles 39 and 40 which are the fixed-setting throttles. Throttle 39 is interacting with throttle 12 via control-line section 41 forming with it a jointly-acting unit. Depending upon the throttle area of throttle 12, a more or less high control pressure will build up in control-line section 41, which will act via pilot line 8 upon the chamber 6 of selector valve 7 and thus exert a load upon the spool 7a of selector valve 7 in the direction of its position b and thus against the force of the centering spring 10. The throttle 40 is interacting with the throttle 30 via the control-line 42, the mixing valve 21, and the control line 20, when the mixing valve 21 is in positions b and a, and in interaction with throttle 22 via the control line 15 when the mixing valve 21 is in mixing position a or control position c and thus forms a jointly-acting unit with the respective throttle. Depending upon the setting of the throttles 22 and 30 and the mixing position a of the mixing valve 21, a more or less high control pressure will build up in the control lines 15 and 20 which will act upon the other pilot chamber 17 of control valve 7 via pilot line 16 which is connected with the pilot-line section 42 and thus act upon the spool 7a in the direction of control position c. The pressure is thus acting against the force of the centering spring 9 and additionally against the control pressure from the throttle pair 39, 12 which prevails in the pilot chamber 6.

Selection of the control position or mixing position respectively of mixing valve 21 is made by the hand lever 44 connected with the spool 21b via the rod 21a.

If the control lever 44 of the mixing valve 21 is moving from the position as shown to that marked by the broken line, the mixing valve will assume its position c, in which the control line 15 is connected with the control-line section 42, and the control-line 20 is interrupted. In this position, the fixed throttle 40 and the adjustable throttle 22 are forming a jointly-acting unit. If the throttle 12 is now set to a higher value by operation of the handle 5 and the lever 3, by which also the control pressure between the fixed throttle 39 and adjustable throttle 12 is changed to a corresponding value, the control spool 7a will move first into position b, acting against the force of the centering spring and connecting the pressure line 32 with the working line connection 33, so that the working fluid which is under pump pressure will open the pilot-operated check valve 34 and impinge upon the cylinder chamber 27a, moving the piston 26 therein in the direction of the bellcrank. By this action, the piston rod 26a will swivel the bellcrank 25 and the eccentric disc 24 will simultaneously move, for a corresponding value, the spring rod 23 carrying the flapper 14 and thus the throttle 22 will be adjusted accordingly. As soon as the control pressure resulting in the control line 15 between the adjustable throttle 22 and the fixed throttle 40 which acts via the control line 16 upon the operating chamber 17 of control valve 7, corresponds to the pilot pressure prevailing in the pilot chamber 6, the spool 7a of the control valve which is additionally loaded by the force of the centering spring 10 will return into the shown initial position a, in which the connection of pressure line 32 to operating-line section 33 is interrupted, so that the positioning cylinder 27 will not perform any further positioning movement. Thus, the control pressure set at the handle 5 of the control lever 3 will correspond to a definite position of the positioning cylinder 27 and therefore also of the bellcrank 25. If the control lever 3 is moved in the direction "lowering" of the arrow 45, the area of the throttle 12 will be enlarged so that the pilot pressure within the pilot-line section 8 and in the pilot chamber 6 of control valve 7 will decrease. Since the originally higher pilot pressure still prevails within the pilot chamber 17, the spool 7a will move in the direction of its control position c, so that now the working-line section 33 is connected with the reservoir and the pressure line 32 is also connected to the reservoir via a restrictor 7b. In the pressure line 32, ahead of the restrictor 7b and thus also within the pilot line 16, a pressure of such magnitude will build up that the pilot-operated check valve 34 will open and connect the cylinder chamber 27a with the reservoir via control valve 7 in control position c. The external load acting upon the lever 25b will cause the piston 28 to move in the direction toward the end wall 27b of the positioning cylinder. At the same time, the eccentric disc 24 will rotate around its axle and the area of throttle 22 is enlarged by the spring rod 23 interacting with the eccentric disc, thus reducing the control pressure in the control line 15 and also, via the mixing valve 21 in its control positions a or c and via the pilot line 16, within the pilot chamber 17 of control valve 7. As soon as pivoting of the bellcrank 25 has reduced the pilot pressure within the pilot chamber 17 of the control valve to a value equivalent to that within the pilot chamber 6 of the control valve, the spool 7 will return to position a in which the working fluid will flow back without pressure from the pump 31 into the reservoir and the connection from operating-line section 33 to the reservoir is closed. Since, at the same time, the control pressure in the pilot line 36 will drop to reservoir pressure, the pilot-operated check valve will be in closed position, thus, effectively inhibiting further positioning travel by the piston 26 in the positioning cylinder 27. If the operating lever 44 is shifted from the position denoted by the broken line to the position shown, the mixing valve will be in the control position b, as shown, in which the control-line section 42 is connected with the control line 20, whilst the connection of the control-line section 42 with the control line 15 is interrupted. Thus, the control pressure which has built up in the control line 20 corresponding to the valve at throttle 30 will be acting within the pilot chamber 17 of control valve 7. This working pressure is determined by the force of a working implement, f.i. a plow, linked by the linkage G to the bell-crank arm 25b and exerted over the lower control rod 28 and the resiliently clamped axle 28a upon the free end 29a of the spring rod 29. With a plow as implement, the force exerted depends upon the working depth of the plow and thus upon the position of the positioning cylinder 27. To maintain a constant level of the power set at throttle 12 by means of the control pressure, the implement must be shifted as to its height in such a manner that the power acting upon it will generate, via throttle 30, a pressure corresponding to the pressure as set at throttle 12.

If the mixing valve 21 is now shifted to mixing position a, control line 15 and also control line 20 will be connected to the pilot-line section 42. The higher of the two pressures prevailing at throttle 22 or 30 respectively will then also obtain in the pilot chamber 17 of control valve 7. This allows delimiting the position of the implement and also the power exerted upon it, according to the value set at throttle 12, wherein the relation of position to power will result from the position of the mixing valve 21 within its setting a. If positioning at one location only is required, f.i. for the working table of combines, beet and potato harvesters, throttle 30 can, of course, be omitted, and likewise mixing valve 21.

According to FIG. 2, showing the design of throttle 30 formed by nozzle 18 and flapper 19, the nozzle 18 is pressed into a bore 50 of the housing 51 and extends into the control fluid chamber 56, whilst the flapper 19 is formed by a piston 53 guided within the bore 52 of the housing, which is in line with bore 50, the end 19a of the piston reaching beyond the housing being held, but allowing adjustment by the thread 19b, near the clamping end 29b of the lever formed by the spring rod 29. The clamping end 29b of the spring rod 29 results from attaching the spring rod end 29c to the housing 51 by means of the fixing bolt 57. The nut 54 prevents inadvertent shifting of the piston 53. The seal ring 55 inserted into the groove 53 allows oiltight extension of the piston 53 out of the housing. Since the chamber for the control fluid into which the control fluid enters via nozzle 18, is in connection with the reservoir, the seal 55 must withstand merely the reservoir pressure which generally corresponds to the atmospheric pressure. The threaded bore 58 which is in communication with the housing bore 50 serves for the connection of the control line 20, and the threaded connector bore 59 which connects to the control fluid chamber 56 serves for the connection of a reservoir line.

Separating the lever, respectively spring rod 29, from the control fluid chamber 56, by having the flapper designed as a piston with a sealed extension, a particular simple design for linking the lever, respectively spring rod, which carries the flapper, with the lower control rod 28c at the throttle 22 where the eccentric disc 24 is arranged at the bellcrank 25. Furthermore, no complicated sealing device need be provided between the lever, respectively spring rod, and the control fluid chamber.

Arrangement of the flapper near the link, or clamping, end respectively of the lever or spring rod, brings the advantage that the control travel at the free end of the lever or spring rod 5, 23a, 29a adjacent to the throttle, provides a simple lever ratio so that the components of the throttle can be kept small, while ensuring good precision of control. The throttles 22 and 12 are of the same design as throttle 30.

Design of hydraulic positioner according to FIG. 3 differs from that per FIG. 1 by the adjustable throttles (12, 22, 30) not consisting of nozzle and flapper but consisting of plungers 2', 14', 19' with their control edges 2a', 14a', 19a' interacting with the control orifices 2b', 14b', 19b' in the valve housing 102', 114', 119'. These control orifices could, of course, also be designed as annular grooves with the requisite control edge, or as control ports. Such design of the throttles has, above all, the advantage that there will be no danger of their contamination by dirt particles carried with the control fluid. Furthermore, the flow can be fully interrupted in a simple manner by the control piston. Finally, such design of the throttle will offer a considerably greater positioning travel from the smallest or zero throttle area to the largest area, than is the case with a throttle formed by flapper and nozzle. Thereby, the extension of the positioner or shifting of the control lever respectively can be transmitted directly to the control piston of the throttle. A longer positioning travel of the moving part of the throttle also ensures a more stable control impulse for the reaching of the respective desired position.

A further difference in the design of the hydraulic positioner according to FIG. 3 versus FIG. 1, consists in the control fluid flowing back to the reservoir being led from the two adjustable throttles 22, 30, which are interacting with the positioner via a two-way valve 61 which can be operated by an actuating cam 60 linked to the piston rod 26a. On operating the two-way valve by the actuating cam, connection from the throttle to the reservoir is interrupted so that the maximal control pressure generated by the control fluid pump 37 will build up in the control lines 15, 20. This control pressure will act via the mixing valve 21 in the pilot chamber 17 of spool 7 in the direction of the pilot chamber 6 which is under the pressure set at throttle 12 by the hand lever. Since the pilot pressure in chamber 6 cannot be higher than the maximum control pressure it is certain that with the two-way valve 61 in closed position, the control valve will be shifted by the centering springs into its center position in which the operating line 33 is separated from the pump 31 and thus further supply of working fluid into the cylinder chamber 27a of the positioning cylinder 27 is interrupted. The maximum stroke of the positioning cylinder 27 and the uppermost position of the linkage G are thus limited in a simple manner. By insertion of a logic element 62 in the operating line 33, a far-going seepage-free shut-off of the cylinder chamber 27a is ensured when the pilot-operated control valve 21 is in its center position.

Furthermore, a difference exists in the circuit design of the hydraulic positioner or FIG. 3 versus that or FIG. 1 inasmuch that each of the two adjustable throttles 22, 30 which are directly actuated by the positioner is coordinated with a fixed throttle 40a, 40b and the control fluid is supplied from the control-fluid pump 37 via control line 38 directly to the two fixed throttles 40a, 40b. This ensures the control pressure resulting from the setting of the respective adjustable throttles 22, 30 continually available at every pair of throttles 22, 40a; 30, 40b, independent of the then obtaining setting of mixing valve 21.

FIG. 4 shows in section the manually operated throttle 12 which is the input source, consisting of a housing 70 with a stepped bore 71 and the control piston 2' which is led in the mid-section 71a of the stepped bore and which is fitted with control grooves 73 interacting in the enlarged section 71b of the stepped bore with a circumferential control edge 72. A pressure spring 74 is arranged within this enlarged section, resting with one end against the plug 75 in the stepped bore and with the other against piston 2'. The control piston 2' is resting with its face 76 at the end opposite to the pressure spring 74 against the actuating pin 77 which is led axially within the lengthwise bore 78a of the threaded spindle 78. The threaded spindle is adjustable within the range of the interior thread of section 71c of the stepped bore. The adjusting button 79 is fixed to the free end 78b of the spindle by means of the locknut 80. The non-threaded end 78c of the spindle has radial bores 81 to contain and radially guide the lock balls 82. The lock balls 82 in the radial bores in the threaded spindle are interacting with circumferential grooves 77a, 77b of the actuating pin within the through-bore 87, or they interact with the circumferential groove 84 within the through-bore 87 of a locking button 85 which is contained in a recess 79a of the adjusting button 79. The outer circumference of the locking button has a circular recess 85a, one side 85b of which interacting as travel limit with the lock washer 86 set within the recess 79b of the adjusting button. The lock button is loaded in the direction of the lock washer 86 by the pressure spring 88 which is resting with one end against the bottom 79c of the recess in the adjusting button and with the other against the face 85c of the locking button. Since the flank 84a of the circular groove 84 of the locking button is inclined, the force of the pressure spring 88 will simultaneously load the locking balls 82 radially and towards the center. If the operating pin 77 is shifting from its unlocked position R (right half) in the direction of the control piston 2', the load exerted in a radial and inward direction upon the locking balls 82 will cause them to detent in the circular groove 77a so that the actuating pin is in a mating fit with the threaded spindle. At the same time, the locking button will be shifted by the force of the pressure spring 88 further in the direction of the lock washer 86 and will thus lock the radial bores 81 of the threaded spindle with its cylindrical area 87a, corresponding to the left position L of the locking button (left half). This will effectively prevent jumping of the locking balls out of the circular groove 77a of the actuating pin. Since the actuating pin is loaded axially outward by the pressure spring 74 acting via the control plunger 2', the inclined flank 90 of the circular groove 77a of the operating pin will be in positive abutment with the locking balls.

At the same time a load directed radially outward is exerted upon the locking balls 82 by the inclined flank 90. This results in a positive release of the actuating pin as soon as the locking button has moved inward against the force of the pressure spring, until the circular groove 84 is positioned within the reach of the radial bores 81 of the threaded spindle. This position is reached when the inner face 85d of the locking button abuts the locknut 80. In this position of the locking button, the inclined flank 90 of the circular groove 77a of actuating pin 77 will press the locking balls into the circular groove 84 of the locking button. The actuating pin is thereby released and will be shifted into its released position, corresponding to position R (right half) by the control plunger 2' being under the load of pressure spring 88. In this position, the control piston 2' is in its closed position, in which the connection between control chamber 92 and the expanded section 71b of the stepped bore 71 is interrupted. Since the control chamber 92 is connected to the control fluid pump 37 via the nozzle body 39a of the fixed throttle 39 and the control passage 38a and control line 38, and to pilot chamber 6 of valve 21 via control passage 8a and control line 8, and on the other hand the expanded section 71b of the stepped bore 71 being connected, via passage 93a and line 34 to the reservoir T, the maximum pressure, as generated by the control fluid pump 37 and determined by the setting of the pressure regulating valve 94 will build up within the control chamber 92, and this pressure will also act via control line 8 upon the pilot chamber 6 of control valve 21, shifting it into the position b in which the cylinder chamber 27a is connected to the working fluid pump 31. This will cause travel-out of the piston 26 with piston rod 26a and thus lifting of the linkage G up to its upper position as determined by the control cam 60 which is interacting with the two-way valve 61. If the actuating pin is pressed back into its locking position, the control plunger 2' will return into its throttling position as determined by the threaded spindle 78. To allow momentary variation of the height setting of linkage G to a lower level without having to change the position of the threaded spindle by using the adjusting button, an axial play S has been provided between the circumferential groove 77a of the actuating pin 77 and the locking balls 82, allowing the control plunger to move for the amount of this play, against the force of the pressure spring 74, further in the direction of the plug 75, enlarging the control gap between the control groove 73 and the control edge 74 for the same amount, and reducing the control pressure in control chamber 92 accordingly. As soon as the exterior force exerting itself on the actuating pin is removed, the actuating pin will return to its position as set by the threaded spindle, wherein the flank 90 of circumferential groove 77d will abut the locking balls. The other circumferential groove 77b serves for the fixing of the actuating pin in such a position where, in order to maintain the upper position of linkage G, the control plunger will assuredly interrupt the connection between control space 92 and the enlarged section 71b of the stepped bore which is connected to the reservoir.

In addition to the nozzle body 39a forming the throttle 39, the throttle bodies 40a', 40b' forming the fixed throttles 40a, 40b, are also connected with the housing passage 38a which is a partial section of control line 38 leading to control fluid pump 37. At the exit side, these throttle bodies 40a', 40b' are connected with the passage sections 15a, 20a, which, on their part are leading to line connections 115, 120 for the control lines 15, 20 to the adjustable throttles 22, 30 and to the rotating part 21a of the mixing valve 21 which is designed as a rotary valve. A passage section 16a leads from the rotating part 21a to the connection 116 for the pilot line 16 leading to the pilot chamber 17 of control valve 21.

In the center position of the rotary part 21a of the mixing valve, as shown, the passage section 16a is in connection with the passage section 15a as well as with the passage section 20a, with the control gaps 21b, 21c being the same for both connections. Thus, the pressure prevailing within passage section 16a and thus also in the pilot chamber 17 of the control valve 21 will be about the median value of the two control pressures prevailing within the control passages 15a, 20a.

If the rotating part 21a of the mixing valve is turned into one or the other direction, the value of the mixing pressure will vary correspondingly Only one connection between the passage section 16a and passages 15a, 20a is open at the respective end positions of the rotary valve. Thus with an open connection of passage section 16a with passage 15a at the corresponding end position of the rotating part of the mixing valve, the connection between passage section 16a and passage 20a will be closed and vice versa. At the end positions of the mixing valve, the pressure prevailing in the pilot chamber 17 of the control valve 21 will be either the control pressure prevailing within throttle pairs 40a, 22 or 40b, 30.

The body 70 for the externally adjustable throttle 12 which is the input source is also the body for the mixing valve 21 and the housing for the throttle bodies 40a', 40b' forming the fixed throttles 40a, 40b.

We claim:

1. A hydraulic control arrangement for positioning an implement comprising a source of operating fluid under pressure; a hydraulic positioner; a pressure line connecting said source to said positioner; a fluid operated three-position selector valve in said pressure line movable between a neutral position connecting said source to a reservoir and two operating positions, in one of which said source is connected to said positioner to move the latter in one direction and in the other of which said positioner is connected to the reservoir so as to move in the other direction, said selector valve including spring means tending to maintain the same in said neutral position and two opposite pilot chambers for respectively moving said selector valve to either of its operating positions; mechanical means connecting said positioner to said implement; a source of control fluid under pressure; a first control line connecting said source of said control fluid to one of said pilot chambers; a fixed throttle and an operator controlled adjustable throttle cooperating therewith in said first control line for producing a predetermined pressure according to the setting of said adjustable throttle, said predetermined pressure being fed to said one pilot chamber tending thereby to move said selector valve from said neutral to one of said operating positions; and feedback means comprising a second control line connecting said source of control fluid to the other of said pilot chambers, and a second fixed throttle and at least one adjustable throttle cooperating therewith and adjusted by engagement with said mechanical means operated by said positioner.

2. A hydraulic control arrangement as defined in claim 1, wherein each of said adjustable throttles comprises a nozzle connected to the respective control line and having an outlet opening, a plate opposite said outlet opening, and means mounting said plate movable toward and away from said outlet opening.

3. A hydraulic control arrangement as defined in claim 2, wherein said means mounting said plate of said operator controlled adjustable nozzle comprises a lever pivotally connected at one end to a fixed pivot axis and having at the other end an operating portion to be actuated by an operator, said plate being fixed to said lever intermediate the ends of the latter.

4. A hydraulic control arrangement as defined in claim 2, wherein said means mounting said plate of the adjustable nozzle of the feedback means comprises a lever tiltably mounted at one end and engaged in the region of the other end by a portion of said mechanical means, said plate being fixed to said lever intermediate the ends of the latter.

5. A hydraulic control arrangement as defined in claim 4, wherein said lever is constituted by a spring rod clamped at said one end to a fixed element.

6. A hydraulic control arrangement as defined in claim 3, wherein said plate is connected to said lever at a distance from said pivot axis which is shorter than the distance of said plate from said operating portion.

7. A hydraulic control arrangement as defined in claim 5, wherein said plate is mounted on said spring rod at a distance from said clamped end which is shorter than the distance of said plate from the region of said other end of said spring rod which is engaged by a portion of said mechanical means.

8. A hydraulic control arrangement as defined in claim 1, where at least one of said adjustable throttles comprises a housing forming a control fluid chamber and being provided with two aligned bores respectively extending from said fluid control chamber to opposite sides of said housing, a nozzle in one of said bores connected at one end to the respective control line and having an outlet at the other end located in said fluid control chamber, a piston sealingly guided in the other of said bores and having an end face in said fluid control chamber opposite said outlet of said nozzle, said piston extending with a portion thereof opposite said end face outside of said housing, and operating means tiltably connected at one end to one side of the housing for changing the distance between said end face of said piston and said outlet of said nozzle, said operating means comprising an elongated member tiltably connected at one end to one side of said housing, said portion of said piston being connected to said member adjacent said one end thereof.

9. A hydraulic control arrangement as defined in claim 1, wherein said feedback means comprises two adjustable throttles cooperating with said second fixed throttle and respectively adjusted by different portions of said mechanical means and a mixing valve in said second control line between said second fixed throttle and said two adjustable throttles cooperating therewith and having a mixing position for mixing the feedback signals produced by said two adjustable throttles.

10. A hydraulic control arrangement as defined in claim 9, wherein said mixing valve is a two-port three-position valve having in addition to said mixing position two end positions to opposite sides of said mixing position, in which in one of said end positions said second fixed throttle cooperates with one of said adjustable throttles in said second control line and in the other end position said second fixed throttle cooperates with the other of said adjustable throttles in said second control line, and operator controlled means for shifting said mixing valve between said positions thereof.

11. A hydraulic control arrangement as defined in claim 1, wherein each of said adjustable throttles comprises a housing formed with a bore therethrough and having an inlet port communicating at the outer end with a respective control line and at the inner end with said bore and an outlet port communicating at the inner end with said bore and with the outer end with a reservoir, a piston slidably guided in said bore and having a control edge for controlling during movement thereof communication between said inlet and said outlet port.

12. A hydraulic control arrangement as defined in claim 11, wherein two adjustable throttles are provided in said second control line, and including spring means connected to each of said pistons for urging the same to a position closing the respective inlet port and lever means acting on said pistons in opposition to said spring means, the lever means for the adjustable throttle in said first control line being operator controlled and the lever means for the two adjustable throttles in said second control line being controlled by engagement with different portions of said mechanical means.

13. A hydraulic control arrangement as defined in claim 12, wherein said lever means for each of said adjustable throttles in said second control line comprise a spring rod clamped at one end and engaging the respective piston spaced from said one end, wherein said mechanical means connecting said positioner of said implement comprises a crank lever having one arm connected to said positioner to be turned during the movement thereof about a fixed axis, said crank lever having a second arm and a portion excentric to said axis and engaging the region of the other end of the spring rod cooperating with the piston of one of said adjustable throttles in said second control line, said mechanical means including further an elongated member connected to said implement and engaging with one end the region of the other end of the spring rod cooperating with the piston of the other adjustable throttle in said second control line, and linkage means connecting said second arm of said crank lever with said elongated member.

14. A hydraulic control arrangement as defined in claim 1, wherein said operator controlled adjustable throttle comprises a housing having a stepped bore having a large diameter portion communicating with a reservoir and a small diameter portion communicating with said one of said pilot chambers of said selector valve and with the fixed throttle cooperating with the operator controlled adjustable throttle, said stepped bore forming between said small and said large diameter portions a control edge, a piston movable in said small diameter portion and having a control edge cooperating with that of the stepped bore to control flow of fluid between said one pilot chamber and said reservoir, spring means cooperating with said piston and urging the same to a first position in which said control edges are spaced in one direction from each other to prevent flow of fluid from said pilot chamber to said reservoir, an actuating pin axially movable in said stepped bore to move said piston in opposition to said spring means to a second position in which said control edges are spaced in a direction opposite to said one direction from each other to permit limited flow of fluid from said one pilot chamber to said reservoir, and releasable locking means cooperating with said pin for maintaining the same in one of two positions in which said piston is in said first or said second position.

15. A hydraulic control arrangement as defined in claim 14, and including a threaded hollow spindle screwed into a threaded portion of said stepped bore and projecting with an end portion thereof beyond said housing, said actuating pin being guided in said hollow spindle movably in axial direction, said locking means comprising a plurality of radial bores in said end portion of said hollow spindle, at least one annular groove in said actuating pin, a plurality of balls respectively located in said bores, and means about said end portion of said spindle for urging said balls from said bores into said groove to thereby lock said pin in a position in which said piston is maintained in said second position.

16. A hydraulic control arrangement as defined in claim 11, wherein said feedback means comprises two adjustable throttles respectively adjusted by different portions of said mechanical means, and including a fluid line connecting the outlet ports of said two adjustable throttles to a reservoir, a two position valve in said fluid line having an open and a closed position, and means cooperating with said positioner for moving said two position valve between said positions thereof.

17. A hydraulic control arrangement as defined in claim 1, wherein said positioner comprises a cylinder communicating at one end with said pressure line downstream of said selector valve and a piston axially movable in said cylinder and connected to said mechanical means.

* * * * *